United States Patent [19]

Advani et al.

[11] Patent Number: 4,979,107
[45] Date of Patent: Dec. 18, 1990

[54] MODIFICATION OF DEVICE CONFIGURATION WHEREIN THE SYSTEM SPECIFIES AND PROMPTS THE USER WITH ONLY PARAMETERS REQUIRED TO BE CHANGED

[75] Inventors: Hira Advani; William L. Terrell, both of Austin, Tex.

[73] Assignee: International Business Machines Corporation, Armonk, N.Y.

[21] Appl. No.: 132,672

[22] Filed: Dec. 11, 1987

Related U.S. Application Data

[63] Continuation of Ser. No. 703,922, Feb. 21, 1985, abandoned.

[51] Int. Cl.$^5$ .................... G06F 3/023; G06F 3/14
[52] U.S. Cl. .................... 364/200; 364/232.2; 364/286.2
[58] Field of Search ... 364/200 MS File, 900 MS File, 364/364 300

[56] References Cited

U.S. PATENT DOCUMENTS

| | | | |
|---|---|---|---|
| 4,245,308 | 1/1981 | Hirschman et al. | 364/200 |
| 4,326,263 | 4/1982 | Given | 364/300 |
| 4,400,769 | 8/1983 | Kaneda et al. | 364/200 |
| 4,403,303 | 9/1983 | Howes et al. | 364/900 |
| 4,425,618 | 1/1984 | Bishop et al. | 364/200 |
| 4,459,661 | 7/1984 | Kaneda et al. | 364/200 |
| 4,559,614 | 12/1985 | Peek | 364/900 |
| 4,604,690 | 8/1986 | Crabtree et al. | 364/200 |

*Primary Examiner*—Lawrence E. Anderson
*Attorney, Agent, or Firm*—Whitham & Marhoefer

[57] ABSTRACT

A process for the modification of device configuration in a computer system is designed to be easy-to-use by the user of the computer system yet allow the user flexibility in the specification of device configuration. The computer system stores parameter values of various default devices and devices already installed in the computer system. When the user invokes an "ADD-DEV" command, the system prompts the user to enter one of a plurality of commands such as add, change or delete. Assuming the user enters the add command, the system prompts the user to enter the name of a default device or a similar device already installed in the system. When that information is entered by the user, the system determines from the stored parameters for the default or similar device which parameters must be re-specified by the user for the device to be added to the system. The system then prompts the user to enter only those parameters requiring respecification. Once those parameters have been respecified, the system stores the respecified parameters together with those parameters common to both the default or similar device and the added device thereby installing the added device in the computer system. The procedure not only simplifies the installation process by the user, but also minimizes the possibility that errors will be made in the installation of the added device. Further, the system allows for the possibility of optionally changing parameters that do not require re-specification or the parameters of devices already installed in the system.

3 Claims, 1 Drawing Sheet

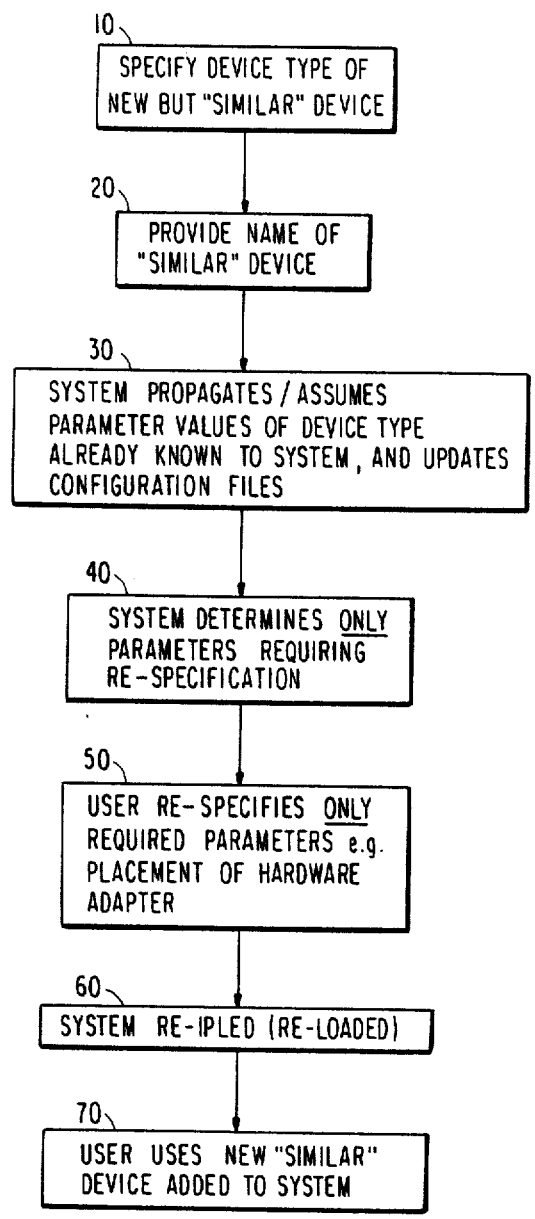

MODIFICATION OF DEVICE CONFIGURATION WHEREIN THE SYSTEM SPECIFIES AND PROMPTS THE USER WITH ONLY PARAMETERS REQUIRED TO BE CHANGED

CROSS-REFERENCE TO RELATED APPLICATIONS

This application is a continuation of copending application Ser. No. 06/703,922, filed Feb. 21, 1985, now abandoned.

This application discloses an invention which is related in subject matter to the invention disclosed in the following copending patent application filed concurrently herewith and assigned to a common assignee herewith:

"Configuration Capability for Devices in an Open System" filed by Hira Advani and William Lee Terrell, Ser. No. 07/132,673 filed concurrently herewith on Dec. 11, 1987, as a continuation of application Ser. No. 06/704,036 filed Feb. 21, 1984.

The disclosure of the foregoing application is incorporated herein by reference.

BACKGROUND OF THE INVENTION

The present invention generally relates to the configuration of peripheral devices in a computer system and, more particularly, to a flexible, easy-to-use mechanism for the complicated task of modifying the device configuration of a personal computer by a sophisticated user.

Personal computers have come into wide spread use by a variety of people. The experience of those using personal computers ranges from relatively uninitiated to sophisticated. In the case of a relatively uninitiated computer user, the hardware and software configuration of the computer system is generally determined by the vendor. But with experience, even the relatively uninitiated become more sophisticated and, as a result, there is a growing population of computer users that separately purchase various hardware and software components which must be assembled into a system. For example, the user may have a personal computer system with a dot-matrix printer and later desire to add a letter-quality printer to the system. This involves more than a simple cable connection between the computer and the added printer. It may require the addition of a second printer port, and the computer, in effect, must be told that a second printer has been added and what the parameters of the second printer are. This process is often referred to as "installing" the printer and the specification of the printer's parameters is part of the configuration process. Even for the sophisticated user, the configuration process can be a complicated task, especially when the process must accommodate a variety of devices such as video displays, diskette drives, plotters and the like from a large number of manufacturers. There exists the possibility that errors may be made in the configuration process with the result that the added device will not function properly or not at all in the system. It is therefore desirable to simplify the reconfiguration process by the user of a personal computer system.

SUMMARY OF THE INVENTION

It is therefore an object of the present invention to provide an easy-to-use process for the modification of device configuration by a user of a computer system.

It is another object of the invention to provide a personal computer system with the capability of allowing the user to easily modify device configurations.

It is a further object of the invention to provide a technique which facilitates the reconfiguration of devices in a computer system and, at the same time, minimizes the possibility of errors in the process.

According to the invention, an "ADDDEV" command is provided which may be applied to a particular device and enables the user to specify the action on the device; i.e., add, delete, modify. Once the action is selected by the user, the system prompts the user to enter the name of a similar device already installed in the system. In addition to storing the parameters of devices already installed in the system, the system is provided with default information for the parameters of selected devices. When the user enters the name of a similar device to be added, for example, the system determines from the stored parameters for the similar device or from default information only those parameters which must be specified by the user for the device to be added. The user is then prompted to enter only those parameters requiring specification, and once those parameters have been entered, the entered parameters and those parameters common to both the similar device named by the user and the added device are stored. Once these parameters are stored, the installation of the added device has been completed. A similar process permits modification of device parameters for devices which have been previously installed to allow for those situations where a previously installed device has been modified to provide other or additional features.

BRIEF DESCRIPTION OF THE DRAWING

The foregoing and other objects, aspects and advantages of the invention will be better understood from the following detailed description of the invention with reference to the accompanying drawing in which the sole figure is a flow diagram illustrating the modification of device configuration process according to the invention.

DETAILED DESCRIPTION OF THE INVENTION

The present invention is particularly described in the environment of so-called personal computers. Such computers are generally also referred to as "micro" computers to distinguish them from "mini" and "main frame" computers. Typically, micro computers are accorded that name because they use a VLSI (very large scale integrated circuit) micro processor chip as the computer "engine". Also, such computers have been in the past stand alone computers used by single users. However, the distinctions between "micro" and "mini" computers especially has never been well defined and those distinctions are becoming more and more blurred with the advent of LANs (local area networks) and multi-tasking and multi-processing operating systems for personal computers. In spite of the clear lack of definition distinguishing micro, mini and main frame computers, it is generally understood that the micro or personal computer has been responsible for a revolution in the computer industry. Not only are more people being exposed to and using computers, but many of the end users are buying and assemblying components to make their own custom computer system that best fits their needs. This is a far cry from the earlier days of the industry when specially trained personnel were required to install, operate and maintain a computer system.

The majority of personal computers sold today may be described as an "open" system which allows various device types from a variety of manufacturers to be assembled into a system. But the process of assemblying a system is not as easy as putting together a component audio system, for example. Take the very common case of adding a printer to a personal computer system. There is an increasing variety of printers available for personal computers ranging from impact printers to ink jet and laser printers. Impact printers account for the largest number of printers presently on the market, but these take a variety of forms such as dot-matrix printers and "daisy-wheel" printers. To add to this diversity, each printer manufacturer may have a different set of driver codes and support different character fonts. Some may even support a graphics and/or multi-color capability. Thus, attaching a printer to a personal computer is not just a matter of attaching a cable between the computer and the printer. The computer must be "told" that a printer has been attached and what its parameters are in order for the computer to generate and supply the required printer data stream to the printer. The present invention provides an "ADD-DEV" command which allows the user to initiate the process of modification of device configuration in a computer system. When the "ADDDEV" command is invoked, the user is first presented with a choice of the commands such as add, change or delete. In a preferred embodiment, the invention provides the user with a screen from which a selection may be made. An example of this type of screen is shown below:

```
ADDDEV commands available are:
add      (add a device)
change   (change device information)
delete   (delete a device)
show     (display device information)
Press help hey for help on how to use ADDDEV.
Press help key after typing a command to get help on
that command.
Press DO to exit ADDDEV.
Enter one of the above commands.
>
```

For purposes of illustration, assume that the user wants to add a printer that is identical to a printer that has been previously installed. The already installed printer may be described as the "preconfigured" printer and identified in the system as LP1. Although the second printer to be installed will have similar parameters to the first, certain parameter settings in the computer system must be changed in order to add this device. Therefore, and in response to this command entered at the ">" prompt, the system prompts the user to specify the device type of the new but "similar" device as indicated in block 10 of the drawing figure The user specifies that an LP1 "preconfigured" printer is to be added. On the screen, the user is warned that an LP1 printer is already installed and asks if another one is to be added. After the user responds "Y", the user is prompted to enter a new printer name. This interactive interchange between the system and user is shown in the screen below:

```
> a printer LP1
This device is already installed in the system.
Do you wish to add another?
Y - yes
N - no
> y
Enter a new name for the device (1-14 alphanumeric
characters).
> LPX
```

After the user specifies a printer name as indicated in block 20 of the drawing figure, the system prompts the user to determine if the user is adding a new adapter card and a new device or is adding a new device to an existing adapter card. In this example, the user is just adding a new printer and will be using an existing adapter card. Based on the user supplied information, the system assumes the parameter values of the device type already known to the system and updates the system configuration files as indicated by block 30 in the drawing figure. Then, in block 40, the system determines only the parameters requiring re-specification by the user. The parameter values which are common to the previously installed device and the device to be added are adopted for the added device. The system prompts the user for the required settings that the user must supply in order to add the device to the system. This may be done with a screen like that shown below:

| The following settings MUST BE SUPPLIED: | | | |
|---|---|---|---|
| Description | Name | Current Setting | Allowed Settings |
| port address | pad | | 70-74 |
| Enter setting name and new value (for example, pad 74). | | | |
| Press DO key when your changes are completed. | | | |
| > pad 71 | | | |
| Required changes made. | | | |

The screen above illustrates the interaction between the system and the user showing that the user has entered the name and value pad 71 and pressed the DO key and the system has responded by indicating that the required changes have been made. The process is indicated in block 50 of the drawing figure. Then, after the user has specified all of the required information, the system asks the user if s/he wants to change any of the other parameter information of this device. For the purposes of this example, it is assumed that the user does not want to change any of the other parameter information. The printer is ready to be added, and the system prompts the user to verify that the user does indeed want to add the printer. Assuming that the user answers in the affirmative, the system displays a "completion" message and goes through a re-IPL (initial program load) routine as indicated in block 60 in the drawing figure. Then, in block 70, the user can use the printer which has been added to the system.

It will be understood by those skilled in the art that the steps of prompting the user as to whether the user wants to change any other parameter settings other than those which the system determines must be specified and to verify that she wants to add the device are optional. These steps allow the user greater flexibility and are incorporated into the preferred embodiment of the invention.

The next example is similar to the preceding one except that a new adapter card as well as a new printer is being added. In this case, additional prompting is required. As before, the user specifies that a LP1 printer is to be added and the system warns the user that the LP1 printer is already installed and asks if another one is to be added. After the user responds in the affirmative, the user is prompted to enter the new printer name after which, the system prompts the user to determine if the user is adding a new adapter card and a new device or is adding a new device to an existing adapter card. The prompt may be in the form of the screen below and, in this example, the user is adding a new card and a new device:

```
The following options are available:
  a   add device to existing adapter card
  b   add device AND an adapter card
  Enter one of the above options.
  > b
```

After the user indicates that both a new card and a new device are being added, the system prompts the user for a service request code (SRC). This code can be obtained from the installation manual for the adapter card. In this example, the user finds the SRC number 30 in the manual and enters it at the prompt in the following screen:

```
A service request code (SRC) is required to add this
device. Refer to your installation manual for this
code.
Enter SRC and press ENTER.
> 30
```

The system then prompts the user for a port address and slot number in the screen below:

| The following settings MUST BE SUPPLIED: | | | |
|---|---|---|---|
| Description | Name | Current Setting | Allowed Settings |
| port address | pad | | 70-74 |
| slot number | sln | | xx-yy |
| Enter setting name and new value (for example, pad 74). Press the DO do key when your changes are completed. | | | |
| Enter setting name and new value. | | | |
| > sln xx | | | |
| Required changes made. | | | |

As before, when the user has specified all of the required information, the system asks the user if s/he wants to change any of the other parameter information for this device. If the user does not want to change any of the other parameter information or after the user has made the desired changes to the other parameter information, the system prompts the user to verify that s/he wants to add the printer.

These simple examples show by way of illustration the principles of the invention. Depending on how different the added device is from one that has been previously installed or from the parameter values of a default device stored in system memory, the user will be required to specify more or less in the way of parameter information. But the important point to understand is that the system requires the user to specify only those parameters that are necessary in order to install the device and takes the default values or those values of a similar device already installed which are common to the added device. By requiring the user to specify only those parameter values that are necessary, the process of modifying the device configuration is greatly simplified and the chances of user error are minimized.

The reason that the user is provided with an opportunity to change other parameter values than those which are required in order to add the device is that the added device may be an improved model having added features from that of either a default in the system or a device already installed in the system. For example, the first printer installed by the user to the system may be a dot-matrix printer having the capability to print alphanumeric characters. The second printer to be added at a later time might have a new read only memory (ROM) having an expanded character set including graphics characters. In this case, the user would want to change the default or common parameter values in order to take advantage of this improved feature of the new printer. This same procedure is used in the change command which the user may choose after invoking the "ADDDEV" command. For example, assume that a dot-matrix printer has already been installed in the system and the manufacturer of the printer produces a retrofit kit which allows the user to install a new ROM chip in order to update the printer to incorporate current model features. In this case, the user would choose the change command and enter the parameter values which need to be changed in order to take advantage of the upgrade in the existing printer.

The invention has been described in terms of adding a printer to a computer system or modifying the parameter values of a printer already installed in the system, but this is merely by way of example only. The device in question may be any type of device capable of being installed in a computer system. Moreover, while the examples given assume that the computer system is a so-called personal computer, those skilled in the art will recognize that the principles of the invention can be applied to larger computer systems where it is desired to provide an easy-to-use procedure for modification of device configuration in the computer system while at the same time minimizing the possibility for errors in making the modification. Although the procedure according to the invention accomplishes these objectives, the preferred embodiment of the invention still allows sufficient flexibility so that the system will accommodate the widest possible variety of device types and parameter values.

We claim:

1. A computer process for the modification of device configuration in a computer system by a user, said computer system storing parameter values of various default device types and device types already installed in the system, said computer process comprising the steps of responding to a user initiated reconfiguration command by prompting the user to enter one of a plurality of commands including an add device command, responding to the add device command entered by the user by prompting the user to enter the name of a default device or a similar device already installed in the system, determining from the stored parameter values for the default or similar device named by the user those parameters which must be re-specified by the user for the device to be added and then prompting the user to enter only those parameters requiring re-specification, and storing the parameters entered by the user for the device to be added together with those parameters common to both the default or similar device named by the user and the added device, thereby installing the added device in said computer system.

2. The computer process for the modification of device configuration in a computer system as recited in claim 1 wherein after the user enters those parameters requiring re-specification, performing the steps of prompting the user to indicate whether other parameters are desired to be changed and, if the user answers in the affirmative, displaying all parameters of the device including those the user was required to re-specify and those common to both the default or similar device named by the user and the added device so as to allow the user to modify other parameters.

3. The computer process for the modification of device configuration as recited in claim 1 wherein one of the commands which the user is prompted to enter after the user initiates a reconfiguration command is a change command, said process further comprising the steps of prompting the user to enter the name of the device to be changed, and responding to the user's naming of the device by displaying all parameters of the device named by the user so as to allow the user to modify the parameters of the named device.

* * * * *